INVENTOR.
BRUCE R. F. KENDALL
BY
ATTORNEY

INVENTOR.
BRUCE R. F. KENDALL

Feb. 15, 1966   B. R. F. KENDALL   3,235,725
METHOD AND APPARATUS FOR DISPLAYING CHANGING SPECTRA
Filed Feb. 7, 1963   3 Sheets-Sheet 3

INVENTOR.
BRUCE R. F. KENDALL
BY
*Rupert J. Brady*
ATTORNEY

United States Patent Office 3,235,725
Patented Feb. 15, 1966

3,235,725
METHOD AND APPARATUS FOR DISPLAYING CHANGING SPECTRA
Bruce R. F. Kendall, State College, Pa., assignor, by mesne assignments, to Nuclide Corporation, State College, Pa., a corporation of Nevada
Filed Feb. 7, 1963, Ser. No. 256,862
18 Claims. (Cl. 250—41.9)

This invention relates to a method and apparatus for displaying changing spectral data, and particularly for displaying changing mass spectra such as those obtained from fast-scanning mass spectrometers.

During the past few years, increased attention has been given to the development of fast-scanning mass spectrometers. Many of these instruments are capable of supplying thousands of complete mass spectra during the course of gas reactions lasting for small fractions of a second. In order to record such rapid changes in gas composition, particularly when these changes involve several different gases, special output circuits and display systems are required.

In the past, several photographic and multi-channel electronic systems have been used for recording changing mass spectra. Where all of the information appearing at the output of a fast-scanning mass spectrometer must be recorded, a rotating drum camera can be used, as disclosed by G. B. Kistiakowsky and P. H. Kydd in The Journal of The American Chemical Society, 79 4825 (1957). With this system successive spectra are displaced vertically, so that peak heights must be measured and replotted before a detailed study can be made of peak height variations as functions of time.

If changes in the amplitude of a single mass peak are to be recorded, a system described by D. C. Damoth, in a paper presented at the Eighth Annual Meeting on Mass Spectrometry of A.S.T.M. Committee E-14, at Atlantic City, New Jersey, in 1960, can be used. In this system the mass peak is displayed on an oscilloscope screen and caused to move steadily across the screen in a direction parallel to its baseline. The envelope of such a display indicates variations of peak height with time. However, the amount of information which can be recorded with this system is limited by eventual overlapping of envelopes corresponding to different masses.

Several other methods have also been used or suggested in the art to record changes in the amplitudes of particular mass peaks. Various types of multi-channel recording circuits have been described by K. T. Fowler and P. Hugh-Jones, in the British Medical Journal, i 1205 (1957); D. C. Harrington, in the Encyclopedia of Spectroscopy (C. F. Clark, Ed.), pg. 628 (Reinhold, N.Y., 1960), and by M. J. H. Stallard, in a paper presented at the Third International Conference on Medical Electronics, in London, 1960. But, these systems are restricted to use at a preselected, limited number of mass positions. Complexity and high cost have prevented general adoption of these methods and systems for routine work.

It is, therefore, the main object of the present invention to provide a simple, economical and convenient method of displaying rapidly changing mass spectra for recording. This method overcomes the disadvantages of prior art systems.

Another object of the invention is to provide a simple electronic system which can be used to display simultaneous peak height versus time traces for all peaks in the mass spectrum.

Another object of the invention is to provide a data display system which is also adaptable for recording changes in many other types of spectra.

Still another object of the invention is to provide an apparatus and method, for displaying rapidly changing mass spectra, which will register peak amplitude changes throughout the mass range.

A further object of the invention is to provide a display system for fast-scanning mass spectrometers which is ideally suited to studies of fast gas reactions and the like.

Still a further object of the invention is to provide a data display system which can be applied to sector-field, time-of-flight and most other types of mass spectrometers.

Other and further objects of the invention are set forth more fully and will become apparent from the specification hereinafter following by reference to the accompanying drawings, in which.

The system of the present invention transforms information contained in repeatedly swept mass spectra directly into a two-dimensional, quantitative display of both mass and peak height information along the vertical axis of an oscilloscope screen display surface, with the horizontal axis utilized as the time axis of the display to provide simultaneous peak height versus time traces for all peaks in the spectrum. Thus in the present invention both the $x$ and $y$ coordinates of a conventional spectrum are displayed along one axis of a cathode-ray screen display surface leaving the other axis of the cathode-ray screen display surface available for use as the time axis. The base lines of the traces are positioned on the vertical axis of the display in such a way as to identify the corresponding mass numbers, and intensity modulation is used to make visible the separate peak height versus time traces for each mass so that the display on the oscilloscope screen discloses traces composed of the intensity modulated peaks of the rapidly-swept mass peaks in the spectrum. The traces thus appearing on the cathode-ray screen of the oscilloscope can readily be photographed if a permanent record is desired.

Figure 1:
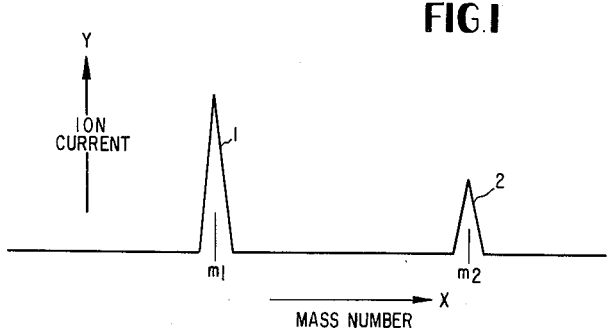
FIG. 1 is an illustration of a typical mass spectrum.

The manner in which mass and amplitude data can be displayed quantitatively along a vertical axis, according to the present invention, can be explained by reference to FIG. 1, wherein a typical two-dimensional mass spectrum is illustrated. This spectrum can be considered as the path traced out by a point which moves in such a way that its $x$ coordinate represents mass number and its $y$ coordinate represents the ion current detected at that mass number. For clarity of explanation, the spectrum display for only two masses $m_1$ and $m_2$ have been illustrated at 1 and 2 and this spectrum can readily be displayed with mass number plotted vertically as illustrated in STEP 1 of FIG. 2. For display and recording purposes generally, only the mass numbers $m_1$ and $m_2$ and the amplitudes $a_1$ and $a_2$ of the peaks are required, so the spectrum can therefore be displayed in a simplified form as illustrated in STEP 2 of FIG. 2, without loss of useful information. The idealized mass peaks can be folded along the vertical axis, as illustrated in STEPS 2 and 3 of FIG. 2, without loss of information provided the mass peaks do not overlap. To allow for peak height indications even in the event of overlapping, the folded idealized peaks can be replaced by markers $A_1$ and $A_2$, indicating the positions of the peak tops, as shown in STEP 4. Thus in the case of peak amplitude $a_2$ overlapping a portion of peak amplitude $a_1$, $a_2$ peak height information will not be lost in the trace of $a_1$ since only the peak tops $A_1$ and $A_2$ are now displayed. Fluctuations in the peak amplitudes $a_1$ and $a_2$ are then represented by corresponding movements of peak top markers $A_1$ and $A_2$. By reducing the amplitudes of the idealized peaks instantaneously to zero, as illustrated in STEP 5, markers $A_1$ and $A_2$ can be brought to the baseline positions $B_1$ and $B_2$. These positions respectively indicate the mass numbers $m_1$ and $m_2$ on the mass scale and the datum positions from which the corresponding peak amplitudes are to be measured.

Figure 2:
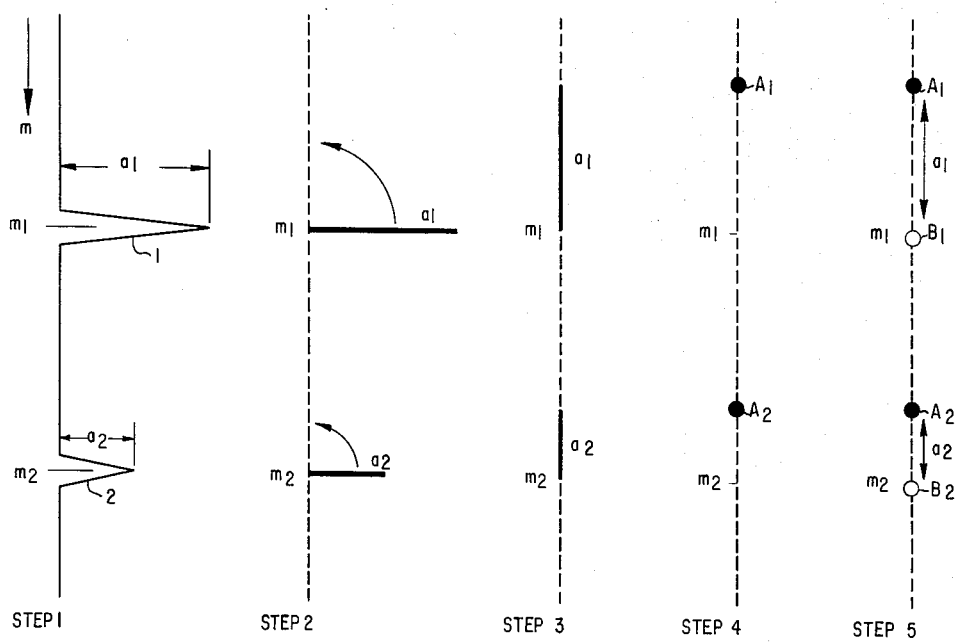
FIG. 2 is a schematic diagram of a series of five steps illustrating the conversion of a two-dimension spectrum display into a vertical one-dimensional display.
Figure 3:
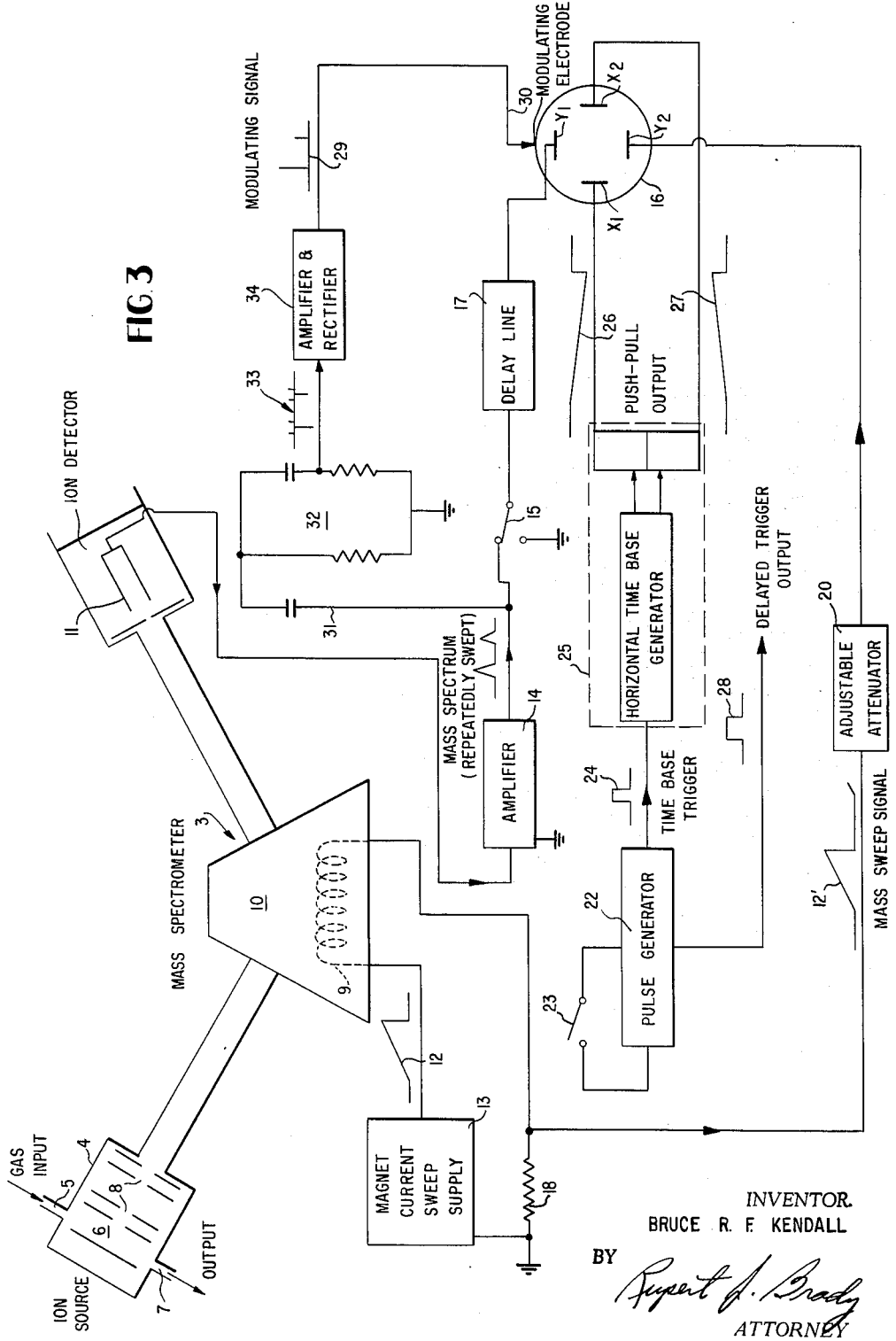
FIG. 3 is a schematic block diagram illustrating the arrangement and connection of components in the display system of the invention, and the manner in which it is connected to an illustrative form of mass spectrometer.

A schematic block diagram of one form of the display system of the invention, for displaying changing mass spectra, according to the method of the invention and utilizing the technique explained with respect to FIG. 2, is illustrated in FIG. 3, connected with a mass spectrometer indicated generally at 3. The spectrometer illustrated, by way of example, is a sector-field magnetic mass spectrometer of conventional type and is adapted for use in studying gas evolution processes. In the spectrometer illustrated, gases of changing composition are fed into an ionization chamber, indicated generally at 6, through inlet 5, and are exhausted from the chamber at 7. The ionization chamber is provided with means, not shown, for developing an ionizing electron beam therein in conventional manner. From the ionization region 6 positive ions pass through a series of slits and accelerating electrodes indicated generally at 8, and through an electromagnetic field produced by coil 9, or the like, in conventional manner in the region indicated generally at 10. The positive ions or positive rays are deflected upwardly by the magnetic field and are converged on an ion detector indicated generally at 11. The intensity of the magnetic field is swept by a cyclic variation of the current supplied by the magnetic current sweep supply. Ions having different mass/charge ratio are deflected into the ion collector at different parts of the sweep cycle, so that the ion detector will detect a definite ion current for different masses to produce a typical mass spectrum output, similar to that illustrated in FIG. 1.

In the system shown in FIG. 3, the coil 9, producing the magnetic field in the mass spectrometer 3, is energized by a sweep signal of the saw-tooth type, such as illustrated at 12, produced in the magnetic current sweep supply circuit 13. Thus, with this arrangement, a repeatedly-swept mass spectrum output is obtained from the ion detector 11. It is to be understood that the spectrometer schematically illustrated in the drawing is included only for purposes of explanation. Other types of ion detectors, such as electron multipliers, may be preferred in specific cases. Other methods of mass sweeping and other types and kinds of mass spectrometers, including non-magnetic types, can equally as well be used with the system of the invention. Also, this type of display system is applicable to other types of spectral instruments other than mass spectrometers.

Figure 4:
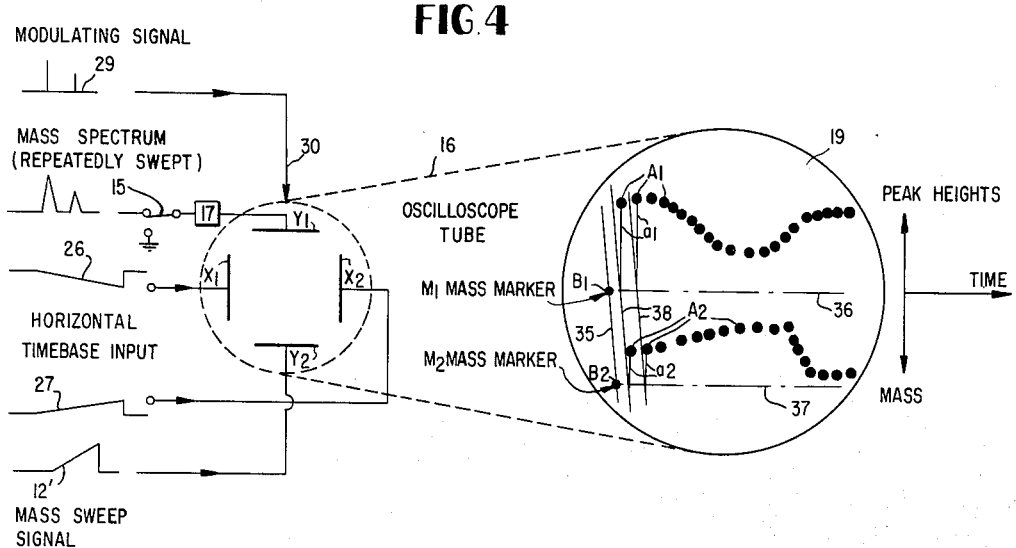
FIG. 4 is a schematic diagram showing the cathode-ray tube connections and illustrating the display produced on the tube screen according to the invention.

From the ion detector 11 the repeatedly-swept mass spectrum signal is fed through an amplifier 14, of conventional design, and from thence is applied to the $Y_1$ deflection plate through the series circuit of a two-position switch 15, preferably of the push button type and a delay line 17. Thus, the mass spectrum, a plot of ion current versus time is, in effect, applied to the vertical deflection plate $Y_1$ through switch 15. One position of switch 15 provides for grounding deflection plate $Y_1$ to suppress the peak height indications, so that the baselines of the peak height versus time traces can be determined and marked at $B_1$ and $B_2$ on the cathode-ray tube screen 19, as illustrated in FIG. 4. The manner by which the baselines of the traces is determined, that is, the datum marks which identify the mass of the ionic species in the spectrum producing each trace, and which indicate the horizontal lines across the cathode-ray screen from which the corresponding peak heights are measured, will be explained more fully hereinafter following:

A signal representing collected mass number as a function of time is applied to the other vertical deflection plate $Y_2$ of the cathode-ray tube. This signal, represented at 12', is in the present example a saw-tooth sweep voltage synchronized with the mass sweep signal 12 of the spectrometer and, as indicated in FIG. 3, may be the same mass sweep signal as 12, being taken from the end of resistor 18 and applied to the vertical deflection plate $Y_2$ through an adjustable attenuator 20 of conventional design. The selectively adjustable attenuator 20 makes it possible to vary the mass scale of the display so that the display can be adjusted to individual requirements.

A simple pulse generator circuit 22 of conventional design, connected for operation upon closing the ON-OFF switch 23, is designed to produce a time base trigger pulse 24 for triggering a horizontal time base generator circuit, indicated generally at 25, having a push-pull output section connected to the horizontal deflection plates $X_1$ and $X_2$ for supplying thereto a horizontal time base signal or sweep voltage, illustrated at 26 and 27, for simultaneously deflecting the cathode-ray tube electron beam or the signal responsive means in the horizontal direction to enable changes in mass peak heights with respect to time to be displayed on the cathode-ray tube screen. The horizontal time base generator circuit 25 may be of the standard type oscilloscope time base circuit, to produce a horizontal sweep on the cathode-ray tube in conventional manner. In addition to supplying the horizontal sweep circuit or time base trigger pulse 24, the pulse generator 22 is adapted to supply a second triggering pulse 28 at a preselected time thereafter, that is, delayed from pulse 24, to initiate the phenomenon to be studied.

A modulating signal, represented at 29, is applied to a suitable modulating electrode in the cathode-ray tube as indicated by circuit 30, to act as a brightness control to make visible only the tops of the mass peaks to provide the desired traces. This modulating signal is obtained from the repeatedly-swept or scanned mass spectrum signal output from amplifier 14 which, in addition, to being supplied to vertical deflection plate $Y_1$, is supplied over circuit 31 to an R-C double differentiating network, indicated generally at 32 to obtain on the output thereof the second differential of peak amplitude with respect to time of the mass spectrum input signal as indicated at 33. The second differential signal is then fed through a modulating amplifier and rectifier of conventional design, indicated generally at 34, in which the signal 33 undergoes phase inversion, if necessary, and removal of unwanted components of the wave form to obtain the modulating signal 29 which, as previously stated, is then applied to a modulating electrode, such as the cathode in the cathode-ray tube to increase the cathode-ray tube spot brightness whenever the ion current or mass peaks pass through a maximum. It is to be understood that the spot brightness on the oscilloscope screen is normally set too low for the electron beam to be visible so that it is brought into the visible range only when a mass peak passes through a maximum. As a modified form the spot brightness can normally be set in the visible range with the modulating signal connected to darken the spot only when a mass peak passes through a maximum to give a negative type display. The previously mentioned delay line 17 is utilized in the circuit to enable the adjustment of the time of arrival of the mass spectrum signal on deflection plate $Y_1$ to coincide with the time of arrival of the corresponding modulating signal 29 at the modulating electrode so that the two signals can be adjusted to synchronism. The delay line 17 thus cancels the delay introduced in the modulating circuit by the modulating amplifier and rectifier 34.

When the system is put into operation, for practicing the display method of the invention, that is when switch 23 is closed to start the pulse generator and mass spectrometer to provide a mass spectrum output from ion detector 11, the brightness of the electron beam in the oscilloscope or cathode-ray tube 16 is set, in conventional manner, by means not shown, at an intensity too low to be visible on the display screen 19. Switch 15 is then switched to the position for grounding deflection plate $Y_1$ to remove the mass spectrum signal therefrom. However, the electron beam is swept downwards by the saw tooth voltage 12', representing the mass sweep of the mass spectrometer which is applied to the deflection plate $Y_2$. Since the mass spectrum signal is still being fed to the modulating amplifier, a modulating signal 29 is supplied to the modulating electrode of the cathode-ray tube whenever a mass peak passes through a maximum to thus brighten the trace at that instant, which, in the example posed earlier in this description, and shown in detail in FIG. 4, gives the two mass markers $B_1$ and $B_2$ which identify the mass $m_1$ and $m_2$ of the mass spectrum on the vertical axis of the display screen and indicate the horizontal base line levels from which peak heights are to be measured for the particular mass of the ionic species. In FIG. 4 the electron beam path for the marker cycle in which the mass markers $B_1$ and $B_2$ are obtained is indicated by the diagonal line 35 with the base lines of the traces for the corresponding masses $m_1$ and $m_2$ being indicated by the horizontal dot-dash lines 36 and 37.

Figure 5:
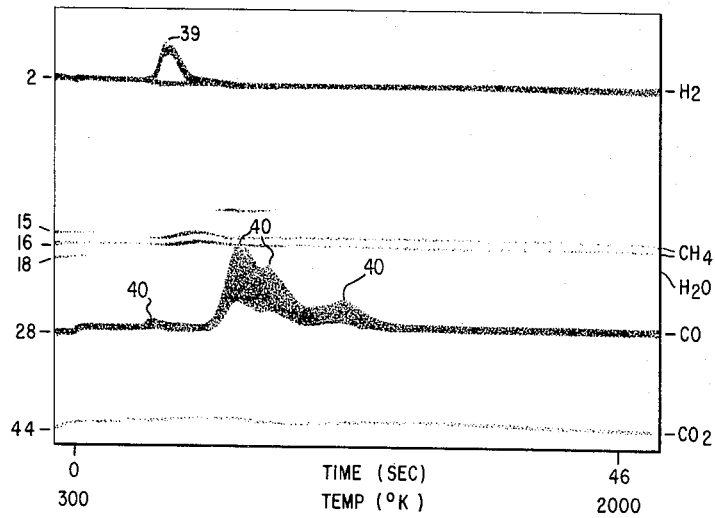
FIG. 5 is a negative illustration of a typical positive photographic record of the cathode-ray tube display according to the invention, obtained from an experiment with apparatus generally similar to that shown in FIG. 3.

Switch 15 is then restored to its original position to reconnect the mass spectrum signal output from the spectrometer to the $Y_1$ vertical deflection plate. The cathode-ray tube electron beam is again swept downwardly by the mass sweep or scan signal 12' on the $Y_2$ deflection plate, as indicated at 38, but now the mass spectrum signal is superimposed on this steady sweep signal and, as shown in FIG. 4, rapid upward deflections $a_1$ and $a_2$ occur whenever a mass peak is registered by the ion detector 11. This portion of the method is correlated to STEPS 2 and 3 of FIG. 2. The amplitude $a_1$ and $a_2$ of each upward deflection is proportional to the height of the corresponding mass peak. As the top limit of each upward deflection the electron beam spot on the cathode-ray screen 19 is brightened by the modulating signal 29 applied to the modulating electrode, so that the spot becomes visible on the screen. In FIG. 4 these brightened peak tops are indicated at $A_1$ and $A_2$. However, in this drawing, which shows typical peak height traces for masses $m_1$ and $m_2$, the spaces between brightened areas are magnified or exaggerated for purposes of clarity in illustration and explanation. In an actual trace the brightened areas are run together, as illustrated in FIG. 5, to provide a continuous trace. Simultaneously, with the downward sweep of the electron beam the horizontal sweep or time base voltage on the $X_1$ and $X_2$ horizontal deflection plates is deflecting the moving electron beam at a comparatively slow rate across the display screen 19, from left to right, so that simultaneous peak height versus time traces are displayed on the screen for each peak or mass in the spectrum. As the gas or other sample in the spectrometer ionization chamber changes in composition, variations in the mass peak heights of the output mass spectrum signal are obtained from successive spectrum scans or sweeps, to thus cause variations in the amplitudes of the peak height traces on the display screen 19 as indicated in FIG. 4. In the display representation of the figure the electron beam path is shown at 38 for two operating cycles of the display system.

By exposing a photographic plate, negative, or the like, in conventional manner, to the brightened display on the cathode-ray tube screen 19, a permanent photographic record can easily be obtained by means of existing conventional type equipment well known in the art. FIG. 5 illustrates a typical photographic record obtained from the cathode-ray tube screen 19. This figure represents a negative illustration of a typical positive photograph showing variations in relative partial pressures of gases desorbed from a tungsten filament during heating from 300° K. to 2000° K. at 38° C. per second. Adsorption time was four hours at a total residual gas pressure of $1.8 \times 10^{-9}$ torr. The base line markers shown along the left hand edge of the illustration identify the gases present by mass number and also indicate the base line positions or levels from which the corresponding peak heights are to be measured. Along the right edge of the illustration the symbols for the gases corresponding to the mass numbers indicated have been shown. Time in seconds and temperature in ° K. are both displayed along the horizontal axis of the illustrations. The steps following the baseline markers indicate the partial pressures of the residual gases, with the major contributions being from hydrogen ($H_2$) and carbon monoxide (CO). Smaller amounts of carbon dioxide ($CO_2$) and methane ($CH_4$) are also present as illustrated. The single hydrogen and complex carbon monoxide desorption peaks are clearly indicated at 39 and 40, respectively. The largest vertical deflection of the carbon monoxide trace corresponds to a partial pressure of approximately $10^{-8}$ torr or $10^{-8}$ mm. Hg. Traces of methane and other gases can also be detected in the illustration of the photographic record.

The limited band width of the oscilloscope circuits used to amplify the modulating signal for this particular display caused some filling-in of desorption peak contours. This, however, does not affect the acuracy of the partial pressure indications which are measured from the upper edges of the peak contours. On the other hand, it does make it somewhat difficult to interrupt traces which cross or overlap. However, this difficulty can be overcome by the use of a nonlinear pulse amplifier in the modulating circuit, but since the details of this refinement are not considered to be an essential part of the invention, this portion of the system is not discussed in detail. Records similar to that illustrated in FIG. 5 have been made for gas desorption processes lasting for times as short as two milliseconds, using a time-of-flight mass spectrometer sweeping at a rate of 25,000 spectra per second.

As shown in the illustration of FIG. 5, the brightened tops of the mass peaks tend to blend together in the display to give a continuous trace and are not separated as shown in exaggerated form at $A_2$ and $A_2$ in FIG. 4.

Apparatus according to the invention has been constructed and the method has been practiced, and results obtained with a display system similar to that shown in FIG. 3, show that it offers a simple, economical changing mass spectra. Although the apparatus described was originally designed for use at the very high sweep frequencies characteristic of time-of-flight mass spectrometers, the principle is equally applicable to other types of mass spectrometers which can be adjusted so that the mass peak tops are narrow and well defined. This condition for narrowing the peaks can usually be met by suitable adjustment of mass spectrometer operating conditions.

In the example shown in FIG. 3, the mass spectrum signal and the mass sweep signal are shown connected to the $Y_1$ and $Y_2$ plates, respectively. An improved system would obtain the same effect by mixing these signals in a suitable manner, amplifying the resultant and applying it by means of a push-pull output circuit to $Y_1$ and $Y_2$.

An important advantage of the display system of the present invention over a conventional multi-channel output system, apart from relative simplicity, is the ability of the system to register peak amplitude changes throughout the mass range instead of only at a limited number of pre-selected mass positions. Therefore, in using this system, there is no possibility of failing to record unexpected but possible significant changes in the mass spectrum which would be missed when using conventional systems.

The main applications of this system appear to lie in the study of fast gas reactions or composition changes, such as are encountered during flash photodesorption, photochemical reactions, and flash thermal desorption. The method is also likely to be useful for studying slower but much more complex reactions, the detailed courses of which would be very tedious to follow by conventional means.

As well as the various possible methods of using the display system in conjunction with a cathode ray oscilloscope tube, there exists a variety of alternative combinations of display systems and recording devices with which similar results could in general be achieved. For instance, the oscilloscope tube could be replaced by an oscillograph in which the light spot deflection or signal responsive means was controlled by the electrical sum of the mass spectrum and mass sweep signals. Intensity of the light spot could be controlled electrically, or electromechanically through use of a shutter mechanism, to brighten the trace as the mass peaks passed through a maximum. Motion of the oscillograph film display surface would replace the horizontal deflection of the electron beam or signal responsive means in the oscilloscope tube. An analogous system could be used with a chart recorder, the pen being the signal responsive means and being dropped onto the moving paper display recording surface momentarily whenever a peak was being recorded.

It will be obvious to one skilled in the art that these display systems are also applicable to the recording of changing spectra from instruments other than mass spectrometers.

While I have described the display system of the invention in certain preferred embodiments I realize that modifications may be made, such as using the horizontal sweep for a representation other than time, and I desire that it be understood that no limitations upon the invention are intended other than may be imposed by the scope of the appended claims.

What I claim as new and desire to secure by Letters Patent of the United States, is as follows:

1. The method for displaying peak value and peak height versus time traces for peaks in a repeatedly-swept spectrum signal from a spectral instrument comprising the steps of:
   (1) energizing one deflection plate of a cathode-ray tube with a sweep signal synchronized with the sweep voltage of a spectral instrument producing the spectrum signal to sweep the cathode-ray tube electron beam across the tube screen in one direction,
   (2) simultaneously applying a repeatedly-swept spectrum signal from the spectral instrument to the opposite deflection plate of the cathode-ray tube to deflect the electron beam in a direction substantially opposite to that of step (1) for each peak in the spectrum signal by the amount of its amplitude,
   (3) simultaneously moving the cathode-ray tube beam across the tube screen in a direction substantially at right angles to the direction of the sweep in step (1) with a time base sweep voltage, and
   (4) increasing the intensity of the cathode-ray tube electron beam to make the same visible on the tube screen only when the peaks of the spectrum signal are being registered.

2. The method of displaying mass number and peak height information versus time of a mass spectrum signal on a cathode-ray tube screen comprising the steps of:
   (1) energizing a vertical deflection plate of a cathode-ray tube with a repeatedly-swept mass spectrum signal from a spectral instrument,
   (2) simultaneously energizing the opposite deflection plate of the tube with a sweep signal synchronized with the mass sweep voltage of the spectral instrument producing the spectrum signal to sweep the cathode-ray tube electron beam downwardly on the tube screen along one axis with the mass spectrum signal superimposed thereon,
   (3) simultaneously energizing the horizontal deflection plates of the tube with a time base sweep voltage to move the electron beam across the tube screen, and
   (4) modulating the intensity of the electron beam to make the same visible on the screen each time a mass peak of the mass spectrum signal of step (1) passes through a maximum peak amplitude to provide separate peak height versus time traces for each mass in the mass spectrum signal on the tube screen.

3. The method of displaying a mass spectrum signal as set forth in claim 1 in which the movement of the cathode-ray tube electron beam of step (3) is at a comparatively slow rate with respect to the movement of the electron beam in step (1).

4. In combination with a spectral instrument having sweep generating means and providing a changing mass spectrum output signal, a cathode-ray display tube having a deflectable beam for producing a display thereon, said tube having first and second deflecting means, means connecting said sweep generating means and said mass spectrum output signal to said first deflection means for deflecting said beam substantially along one axis for displaying mass and amplitude of the mass spectrum output signal on the one axis, and separate sweep generating means connected to said second deflection means for deflecting said beam along another axis for displaying time thereon to produce a single display on said display tube with said beam of mass and variating in amplitude versus time for each mass in the changing mass spectrum output signal.

5. Apparatus for displaying mass and peak height versus time of changing mass spectra output signals of a spectral instrument of the type having a sweep voltage signal comprising, a cathode-ray display tube having a deflectable electron beam, a first pair of deflection means for said tube, circuit means connected with one of said deflection means of said first pair for applying a sweep voltage thereto in synchronism with the sweep voltage signal of the spectral instrument for deflecting the electron beam in one direction, means connecting the other deflection means of said first pair to the output of the spectral instrument for applying the mass spectrum output signal thereto for deflecting the electron beam in a substantially opposite direction upon occurrence of peaks in the mass spectrum signal to display mass and peak height of the spectrum signal in the same axis, a second pair of deflection means for said tube, and time base sweep generator means connected to said second pair of deflection means for simultaneously deflecting the electron beam in a direction transverse to the direction of deflection by the first pair of deflection means for displaying simultaneous peak height versus time traces on the cathode-ray display tube for all peaks in the spectrum signal.

6. Apparatus as set forth in claim 5 and modulating signal producing means connected with said cathode-ray display tube for increasing the intensity of the electron beam each time a peak in the mass spectrum output signal passes through a maximum.

7. Apparatus as set forth in claim 6 in which said modulating signal producing means and said means connecting the other deflection means of said first pair are commonly connected to the output of the spectral instrument to receive the spectrum output signal therefrom.

8. Apparatus as set forth in claim 7 and said means connecting the other deflection means of said first pair to the output of the spectral instrument, including a delay line connected between the other deflection means and said common connection to provide synchronous arrival of signals from said means connecting the other deflection means to the spectral instrument and from said modulating signal producing means on said cathode-ray display tube.

9. Apparatus as set forth in claim 7 in which said means connecting the other deflection means of said first pair to the output of the spectral instrument include switch means connected between the other deflection means and said common connection, and said switch means operable to an open position to remove the spectrum signal from said other deflection means to establish base line markers for the display traces with said modulating signal producing means.

10. The method of displaying the amplitude and value of a peak in a spectrum signal from a spectral instrument versus time on a display surface means comprising:
   (1) moving a signal responsive means across the display surface means in one direction in synchronism with the sweep signal of the spectral instrument producing the spectrum signal,
   (2) simultaneously additionally deflecting the signal responsive means in a substantially opposite direction at the value for each peak in the spectrum signal by the amount of its amplitude,
   (3) operating the signal responsive means to make visible indicia on the display surface means only when the maximum amplitudes of the peaks of the spectrum signal are being registered, to provide a trace display for each peak in the spectrum signal, and
   (4) simultaneously relatively moving the display surface means and the signal responsive means in a direction substantially at right angles to the direction of movement of the signal responsive means in step (1).

11. The method of displaying amplitude and energy value of a peak in a spectrum signal from a spectral instrument versus time on a cathode-ray tube screen comprising:
   (1) moving the cathode-ray tube electron beam across the tube screen in one direction in synchronism with the sweep signal of the spectral instrument producing the spectrum signal,
   (2) simultaneously additionally deflecting the electron beam in a substantially opposite direction at the energy value for each peak in the spectrum signal by the amount of its amplitude,
   (3) simultaneously moving the cathode-ray tube electron beam across the screen in a direction substantially at right angles to the direction of the sweep in step (1), and
   (4) increasing the intensity of the electron beam to make the same visible on the screen only when the maximum amplitude of the peaks of the spectrum signal are being registered, to provide a trace display for each peak in the spectrum signal.

12. The method of displaying amplitude and energy value of a peak in a spectrum signal from a spectral instrument versus time on a cathode-ray tube screen comprising:
   (1) moving the cathode-ray tube electron beam across the tube screen in one direction in synchronism with the sweep signal of the spectral instrument, producing the spectrum signal,
   (2) simultaneously additionally deflecting the electron beam in a substantially opposite direction at the energy value for each peak in the spectrum signal by the amount of its amplitude,
   (3) simultaneously moving the cathode-ray tube electron beam across the screen in a direction substantially at right angles to the direction of the sweep in step (1), and
   (4) decreasing the intensity of the electron beam to darken the visible trace on the screen only when the maximum amplitude of the peaks of the spectrum signal are being registered, to provide a trace display for each peak in the spectrum signal.

13. The method of displaying amplitude and peak value versus time of a spectrum signal from a spectral instrument on the film of an oscillograph comprising:
   (1) moving the electron beam of the oscillograph across film surface in one direction in synchronism with the sweep signal of the instrument producing the spectrum signal,
   (2) simultaneously additionally deflecting the electron beam of the oscillograph in a substantially opposite direction for each peak in the spectrum signal by the amount of the amplitude of the peak,
   (3) simultaneously moving the oscillograph film in a direction substantially at right angles to the direction of beam movement in step (1), and
   (4) intensifying the electron beam indicating spot of the oscillograph on the oscillograph film only when the peaks of the spectrum signal are being registered, to provide a trace display for each peak in the spectrum signal on the film.

14. The method of displaying amplitude and peak value versus time of a spectrum signal from a spectral instrument on a display surface means comprising:
   (1) moving a signal responsive means across the display surface means in one direction in synchronism with the sweep signal of the instrument producing the spectrum signal,
   (2) simultaneously additionally deflecting the signal responsive means in substantially the same direction for each peak value in the spectrum signal by the amount of its amplitude,
   (3) simultaneously relatively moving the display surface means and the signal responsive means in a direction substantially at right angles to the direction of movement of the signal responsive means in step (1), and
   (4) operating the signal responsive means to produce visible indicia on the display surface means only when the peaks of the spectrum signals are being registered to provide peak amplitude versue time trace display for each peak in the spectrum signal.

15. The method of displaying amplitude peak value time of a spectrum signal from a spectral instrument on a display surface means comprising:
   (1) mixing a spectrum signal and a sweep signal synchronized with the sweep signal of the instrument producing the spectrum signal, to obtain a resultant signal,
   (2) moving a signal responsive means with the resultant signal across the display surface means with the spectrum signal portion of the resultant signal moving the signal responsive means in a substantially opposite direction, upon the occurrence of each peak in the spectrum signal by the amount of the amplitude of the peak, from the direction the signal responsive means is moved by the sweep signal portion of the resultant signal, and
   (3) operating the signal responsive means to produce visible indicia on the display surface means only when the peaks of the spectrum signal portion of the resultant signal are being registered, to provide a trace display for each peak in the spectrum signal.

16. The method as set forth in claim 15, including:
   (4) simultaneously moving the display surface means in a direction substantially at right angles to the direction of movement of the signal responsive means.

17. The method as set forth in claim 5, including:
(4) simultaneously moving the signal responsive means across the display surface means in a direction substantially at right angles to the directions of movement of the signal responsive means in step (2).

18. The method of displaying amplitude and value of each peak versus time of a spectrum signal from a spectral instrument on a display surface means comprising:
(1) mixing a spectrum signal and a sweep signal synchronized with the sweep signal of the instrument producing the spectrum signal, to obtain a resultant signal,
(2) moving a signal responsive means across the display surface means with the resultant signal with the spectrum signal portion of the resultant signal instantaneously deflecting the signal responsive means for each peak in the spectrum signal by the amount of its amplitude in substantially the same direction as the movement of the signal responsive means by the sweep signal portion of the resultant signal, and
(3) operating the signal responsive means to produce visible indicia on the display surface means only when the peaks of the spectrum signal portion of the resultant signal are being registered, to provide a trace display for each peak in the spectrum signal.

References Cited by the Examiner

UNITED STATES PATENTS

| | | | |
|---|---|---|---|
| 2,331,189 | 10/1943 | Hipple | 250—41.9 |
| 2,642,535 | 6/1953 | Schroeder | 250—41.9 |
| 2,743,371 | 4/1956 | Kerns | 250—41.9 |
| 2,834,888 | 5/1958 | Norton | 250—41.9 |

RALPH G. NILSON, *Primary Examiner.*